Patented Mar. 18, 1952

2,589,290

UNITED STATES PATENT OFFICE 2,589,290

REACTION OF CARBON MONOXIDE AND HYDRAZINE AND PRODUCT THEREOF

Herman J. Sampson, Jr., Wilmington, Del., assignor to E. I. du Pont de Nemours & Company, Wilmington, Del., a corporation of Delaware No Drawing. Application January 11, 1950, Serial No. 138,067

6 Claims. (Cl. 260—1)

This invention relates to new chemical processes involving carbon monoxide and to the resulting products.

This application is a continuation of my copending application Serial No. 18,295, filed March 31, 1948.

Because of the abundant availability, chemical versatility, and low cost of carbon monoxide its chemistry is receiving increasing attention. During the war certain of its reactions formed the basis of important chemical industries which provided Germany with valuable chemicals which were in short supply and great demand. The reactions of carbon monoxide with nitrogenous compounds have been investigated to a limited degree. Thus, its reaction with ammonia and with primary, secondary, and tertiary amines have been investigated. With ammonia the reaction can be made to yield either urea or hydrocyanic acid and with the primary, secondary, and tertiary amines there can be obtained either ureas or formyl derivatives, or both, depending upon the conditions of operation.

It is an object of this invention to provide a new chemical process utilizing carbon monoxide as a reactant. A further object of this invention is to prepare valuable nitrogenous compounds utilizing carbon monoxide as a reactant. A still further object is to prepare new chemical compounds. Another object is to provide improved synthesis for the nitrogen compound corresponding to the molecular formula $C_2H_4N_4O$ [1,2-dihydro-3(4-sym. tetrazone)]. Other objects will appear hereinafter.

According to this invention the nitrogen compound corresponding to the molecular formula $C_2H_4N_4O$ [1,2-dihydro-3(4-sym. tetrazone)] and a new water soluble nitrogenous compound, corresponding in molecular formula $C_4H_6N_6$, melting at 120.4° to 121.4° C. and boiling at 268.5° to 269° C. at 759 mm, are produced by a process which comprises reacting carbon monoxide with hydrazine at superatmospheric pressures and at temperatures in the range of 100° to 300° C.

It has been found that when carbon monoxide is reacted with hydrazine under pressure and at elevated temperatures in the absence of an added metal carbonyl catalyst, the products are the nitrogen compound corresponding to the molecular formula $C_2H_4N_4O$ [1,2-dihydro-3(4-sym. tetrazone)] or the new water-soluble nitrogenous material corresponding in molecular formula to $C_4H_6N_6$. This invention therefore provides a new route to the known nitrogen compound corresponding to the molecular formula $C_2H_4N_4O$ [1,2-dihydro-3(4-sym. tetrazone)] and makes available the new water-soluble nitrogenous product mentioned above.

The preferred temperature range for the preparation of principally the nitrogen compound corresponding to the molecular formula $C_2H_4N_4O$, [1,2-dihydro-3(4-sym. tetrazone)], is from 100 to 200° C., while the preferred temperature range for the preparation of principally the water-soluble nitrogenous product, $C_4H_6N_6$, is 200–300° C. The best yields of these two compounds are obtained at temperatures of 150–200° C. and 250–300° C., respectively.

It is to be understood that there is no sharp dividing line separating the process conditions for the formation of the nitrogen compounds corresponding to the molecular formula, $C_2H_4N_4O$ [1,2-dihydro-3(4-sym. tetrazone)] and $C_4H_6N_6$ in the absence of a catalyst. The facts are that the reaction conditions for the preparation of these compounds overlap. It is possible to prepare both the nitrogen compounds corresponding to the molecular formula, $C_2H_4N_4O$, [1,2-dihydro-3(4-sym. tetrazone)] and $C_4H_6N_6$ from hydrazine and carbon monoxide in the absence of a catalyst, for example at 200°C. Minor variations in the operating condition, i. e., temperature, tend to favor the formation of one product over the other.

The process is operated in the absence of a catalyst under pressure in excess of 60 atmospheres. Pressures above about 1000 atmospheres may be used if desired, but the employment of such high pressures does not appear to have compensating advantages from the standpoint of yield.

The examples which follow are submitted to illustrate and not to limit this invention. The yields expressed in the examples are based on the use of one mole of hydrazine per two nitrogens in the product.

Example I

Fifty grams of hydrazine hydrate was heated at 175° C. for 4 hours under a pressure of 900 atm. of carbon monoxide to produce a slurry of white crystals in a light brown syrup. This mixture was filtered and washed with absolute ethanol to give 16 g. (32%) of solid melting at 160° to 165° C. Crystallization from absolute ethanol raised the melting point to 187° to 188° C. This compound was identified as the nitrogen compound corresponding to the molecular formula $C_2H_4N_4O$ [1,2-dihydro-3(4-sym. tetrazone)]. It was water-soluble and boiled at 315° C.

Example II

Fifty grams of hydrazine hydrate was heated at 250° C. for 8.5 hours under a pressure of 900 atm. of carbon monoxide. The product was distilled to give as the main fraction 48 g. of white solid (52% yield). The product, indicated by analysis to be $C_4H_6N_6$, had a M. P. of 120.4° to 121.4° C., a B. P. of 268.5° to 269° C. at 759 mm., was very water-soluble, and could be recrystallized from a mixture of ethanol and chloroform. It contained two basic groups titratable with acid but did not resinify with formaldehyde.

Example III

Fifty (50) grams of 100% hydrazine hydrate ($N_2H_4 \cdot H_2O$) was heated at 200° C. for 3.25 hours under a pressure of 600–900 atmospheres of carbon monoxide. The clear, colorless liquid product thus obtained was allowed to stand for several hours, and the white crystalline product, which slowly precipitated therefrom, was removed by filtration and washed with ethanol. No attempt was made to isolate any product from the filtrate. The resulting material (7.5 grams) was recrystallized from denatured alcohol to give white crystals melting at 187.5° C. This compound was identified as the nitrogen compound corresponding to the molecular formula $C_2H_4N_4O$, [1,2-dihydro-3-(4-sym. tetrazone)], described in Example I.

One-hundred (100) grams of 100% hydrazine hydrate was heated at 200° C. for 5½ hours under a pressure of 900 atmospheres of carbon monoxide in the same manner as just described. The clear, colorless liquid product thus obtained was distilled over a range of 30° C. at atmospheric pressure to 200° C. at a pressure corresponding to 5 mm. of mercury. Toward the latter part of the distillation, a white solid distilled over. This solid product, approximately 10 grams, was recrystallized from a solvent mixture of ethanol and chloroform to give a white crystalline product melting at 119° C. Further recrystallization until a constant melting product was obtained yielded a white crystalline material melting at 120.4–121.4° C. This material, by analysis, was found to be the compound of molecular formula, $C_4H_6N_6$, as previously described in Example II.

Since hydrazine is potentially a cheap chemical, its reactions with carbon monoxide present an improved syntheses for existing products and for the preparation of new chemicals of interest per se and as intermediates for other syntheses. The process of this invention is an improvement over prior methods for preparing the water-soluble nitrogen compound corresponding to the molecular formula $C_2H_4N_4O$ [1,2-dihydro-3(4-sym. tetrazone)] and provides a method of preparing the new water-soluble nitrogen compound corresponding to the molecular formula $C_4H_6N_6$.

The nitrogen compound corresponding to the molecular formula $C_2H_4N_4O$ [1,2-dihydro-3(4-sym. tetrazone)] is useful as a synthetic resin intermediate, especially for formaldehyde condensation products, as an anti-shrinking material for wool and rayon, as a paper-size, a rubber chemical, a metal deactivator, and the like. The water-soluble compound of formula $C_4H_6N_6$ is useful as a paper size, fire retardant, corrosion inhibitor, and the like.

As many apparently widely different embodiments of this invention may be made without departing from the spirit and scope thereof, it is to be understood that I do not limit myself to the specific embodiments thereof except as defined in the appended claims.

I claim:

1. A process for producing water-soluble nitrogen compounds having the molecular formulas $C_2H_4N_4O$ and $C_4H_6N_6$ which comprises reacting carbon monoxide with hydrazine at a temperature of 100° to 300° C. under superatmospheric pressure in excess of 60 atmospheres and isolating from the reaction mixture one of said water-soluble nitrogen compounds having the molecular formulas $C_2H_4N_4O$ and $C_4H_6N_6$.

2. A process for producing a water-soluble nitrogen compound having the molecular formula $C_2H_4N_4O$ which comprises reacting carbon monoxide with hydrazine at a temperature of 100° to 200° C. under a pressure in excess of 60 atmospheres and isolating from the reaction mixture said water-soluble nitrogen compound $C_2H_4N_4O$.

3. A process as set forth in claim 2 wherein said temperature is from 150° to 200° C.

4. A process for producing a water-soluble nitrogen compound having the molecular formula $C_4H_6N_6$ which comprises reacting carbon monoxide with hydrazine at a temperature of 200° to 300° C. under a pressure in excess of 60 atmospheres and isolating from the reaction mixture said water-soluble nitrogen compound $C_4H_6N_6$.

5. A process as set forth in claim 4 wherein said temperature is from 250° to 300° C.

6. A water-soluble nitrogen compound having the molecular formula $C_4H_6N_6$ containing two basic groups titratable with acid, having a melting point of 120.4° to 121.4° C., and a boiling point of 268.5° to 269° C. at 759 mm. and which is the product of the reaction of carbon monoxide with hydrazine at a temperature of 200° to 300° C. under a pressure in excess of 60 atmospheres.

HERMAN J. SAMPSON, Jr.

No references cited.